Patented Apr. 24, 1934

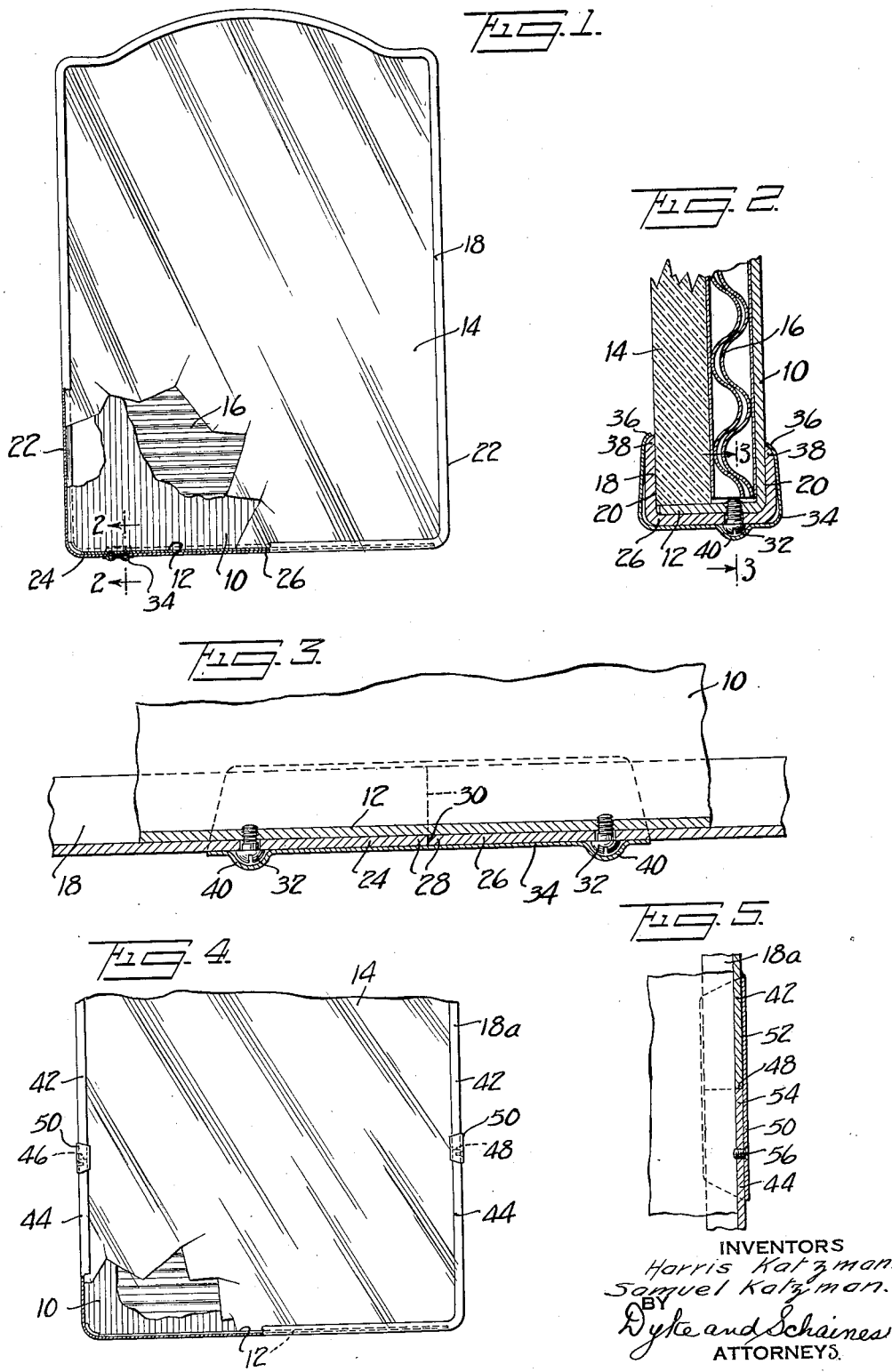

1,956,173

UNITED STATES PATENT OFFICE 1,956,173

MOUNTING FOR MIRRORS

Harris Katzman and Samuel Katzman, Brooklyn, N. Y.

Application September 16, 1931, Serial No. 563,088

3 Claims. (Cl. 45—18)

Our invention relates to mountings for a mirror or glass, and particularly to mountings adapted for use as doors or closures for medicine cabinets and the like, and the same has for its object to provide a simple, efficient and durable structure which is effective in adequately supporting the glass so as to reduce strains and stresses thereon liable to cause the chipping, breaking or other damaging of the glass.

Another object of the invention is to provide a structure of the character specified in which the glass is supported independently of the frame therefor so that the glass is less liable to become damaged and so that the strain on the frame is reduced.

Another object of the invention is to provide a structure of the character specified in which the frame therefor is secured to render the same rigid at the joint and to reduce or prevent relative movement between the frame and the parts enclosed thereby.

Another object of the invention is to provide a structure of the character specified in which the back plate thereof is utilized for supporting the glass, or for securing the frame, or both.

Other objects will in part be obvious and in part be pointed out hereinafter.

In the accompanying drawing:

Figure 1 is a front elevation of one form of mounting constructed according to and embodying my said invention, parts being broken away;

Fig. 2 is an enlarged section thereof on the line 2—2 of Fig. 1;

Fig. 3 is an enlarged section thereof on the line 3—3 of Fig. 2;

Fig. 4 is an elevation showing a modified form of frame; and

Fig. 5 is an enlarged section thereof.

Referring to the drawing, the back plate 10 of the mounting is provided with a forwardly directed supporting means or flange 12 at the lower edge thereof on which the glass 14 constituting the mirror rests. The back plate and mirror are preferably substantially of the same size and shape so that the edges thereof are substantially in alignment. One or more sheets of corrugated card board 16, or other yieldable material are interposed between the back plate 10 and glass 14 to take up any jar or strain. The back plate 10 is preferably of metal or the like and may be provided with the usual connections or hinges for supporting the same from a wall or as the closure for a medicine or other cabinet.

The back plate 10, glass 14, and yieldable sheets 16 are preferably retained together by a channel-shaped frame 18 receiving the flange 12 and the edge portions of the parts. The frame 18 is preferably composed of a single piece of sheet steel of channel formation shaped to fit the edges of the plate 10 and mirror 14. The interior channel 20 of the frame 18 has a width substantially fitting the flange 12 so that, when the parts are assembled, the edges of the back plate 10, glass 14 and sheets 16 are retained within the channel with the lower edges of the glass and sheets upon and within the confines of said flange 12. The channel frame 18 has, when the mirror is of substantially rectangular shape, substantially straight sides 22, the end portions 24 and 26 thereof being bent inwardly therefrom to form the lower side of the frame. The ends 28 of the frame 18 are normally in substantially abutting relation forming a joint 30 adapted to be bridged by the flange 12. The frame 18 at the joint 30 is preferably secured, by means of headed screws 32 or other fastening means, to the flange 12 of the back plate 10.

The joint 30 and the screws 32 are covered by a U-shaped clip member 34 adapted to fit the outside of the frame 18 at the joint and provided with slightly inturned longitudinal edges 36 adapted to extend over or interlock with the longitudinal edges 38 of the channel frame to prevent the clip from dropping off. The clip 34 is provided with raised portions or interior recesses 40 receiving the heads of the screws 32 and preventing movement of the clip lengthwise of the frame.

In the modification shown at Figs. 4 and 5, the channel frame 18$^a$ is formed as two U-shaped channel sections 42 and 44 providing joints 46 and 48 at the sides. A U-shaped member 50 is welded or otherwise secured to one end 52 of a section of frame 18$^a$ at each joint, and projects beyond the same to receive the contiguous end 54 of the other section. A screw 56 passes through the member 50 and end portion 54 for securing the same together.

By our invention, the weight of the mirror 14 is supported by the back plate 10 so that the frame 18 or 18$^a$ serves merely to retain the parts together. Liability of chipping, breaking, or otherwise damaging the glass is thus materially reduced, and undue strain is taken off of the frame.

Further, the ends of the frame may be readily brought into abutting relation and suitably secured together, and preferably to the flange 12 on the back plate, thereby preventing relative movement between the frame and the back plate, and forming a rigid frame structure.

While we have illustrated the frame as being substantially rectanbular, the same can conform to a mirror of other configurations, such as oval shaped mirrors.

Having thus described our invention, what we claim and desire to secure by Letters Patent is:

1. A structure of the character described comprising a glass, a back plate having a flange projecting forwardly at the edge thereof, a channel frame receiving said flange and the edge portions of the back plate and glass, and having ends in abutting relation, means for securing said frame at the joint thereof to said flange, and a channel member embracing the outer side of said frame and overlapping said joint.

2. A structure of the character described comprising a glass, a back plate having a flange projecting forwardly at the edge thereof, a channel frame receiving said flange and the edge portions of the back plate and glass, and having ends in abutting relation, means for securing said frame at the joint thereof to said flange, and a channel member embracing the outer side of said frame and overlapping said joint, said channel member having edge portions interlocking with the edge portions of said frame, and means interlocking with said securing means to retain the channel member in position.

3. A structure of the character described comprising a glass, a back plate having a flange projecting forwardly over the edge of the glass, a channel frame having abutting ends forming a joint and receiving said flange and the edge portions of the back plate and glass, headed screws extending through the ends of said frame at the joint and secured to said flange, and a channel member overlapping said frame at the joint and having interior recesses receiving the screw heads.

SAMUEL KATZMAN.
HARRIS KATZMAN.